2 Sheets—Sheet 1.
J. J. PIGGOTT.
HARVESTER.
No. 177,270. Patented May 9, 1876.
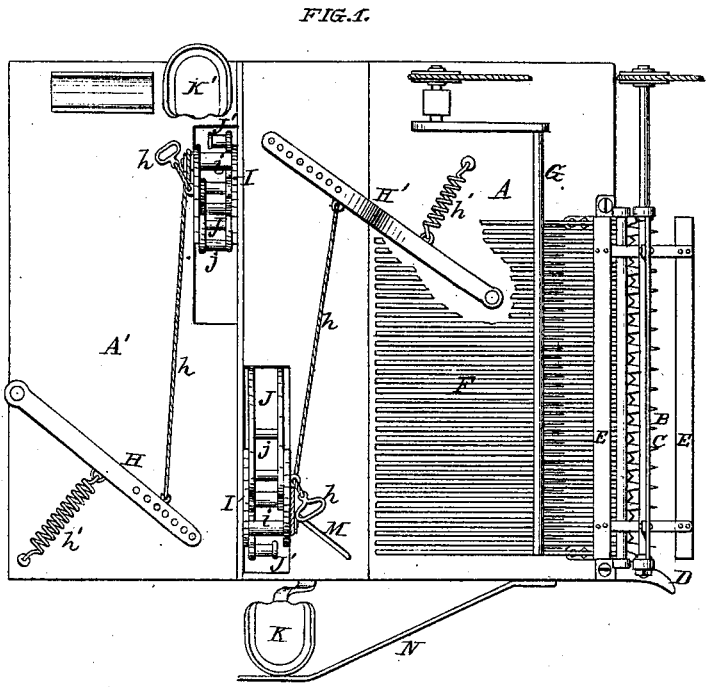
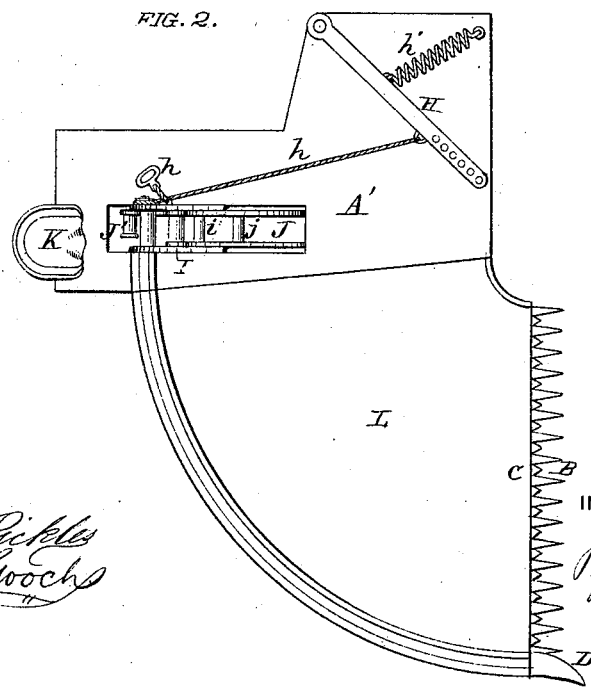
ATTEST:
Charles Pickles
Chas J. Gooch
INVENTOR:
Jabez J. Piggott
By Knight Bros.
Attys.

2 Sheets—Sheet 2.

J. J. PIGGOTT.
HARVESTER.

No. 177,270. Patented May 9, 1876.

ATTEST:
Charles Pickles
Chas J Gooch

INVENTOR:
Jabez J. Piggott
By Knight & Bro.
Attys.

UNITED STATES PATENT OFFICE.

JABEZ J. PIGGOTT, OF ST. LOUIS, MISSOURI.

IMPROVEMENT IN HARVESTERS.

Specification forming part of Letters Patent No. 177,270, dated May 9, 1876; application filed August 13, 1875.

*To all whom it may concern:*

Be it known that I, JABEZ J. PIGGOTT, of St. Louis, St. Louis county, State of Missouri, have invented a new and useful Improvement in Binding Attachments for Harvesters, which improvement is fully set forth in the following specification, reference being had to the accompanying drawings.

This invention consists in a fixed stationary arm and an oscillating arm, operated by foot, so as to compress the bunch during the tying operation. These arms are composed of two parallel side bars, connected together by cross-pins, on which are anti-friction rollers, and on these rollers the tie-band is placed before the grain is received between the arms. The grain, as it is cut, falls on a pivoted spring-platform, from which it is swept by a rake onto a raised part of the main platform, where it is caught by a rake operated by hand, and drawn into a bunch for the action of the compression-arms.

Figure 3:
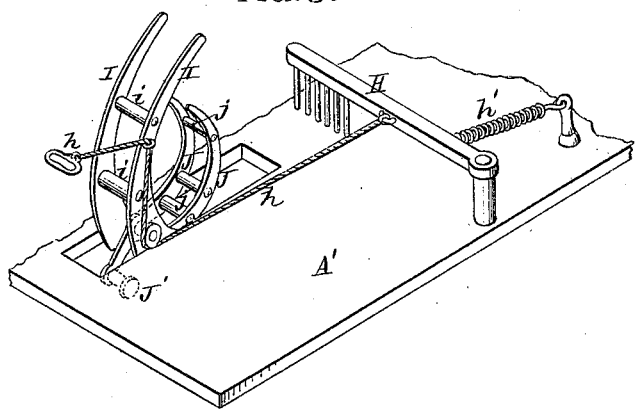
Figure 4:
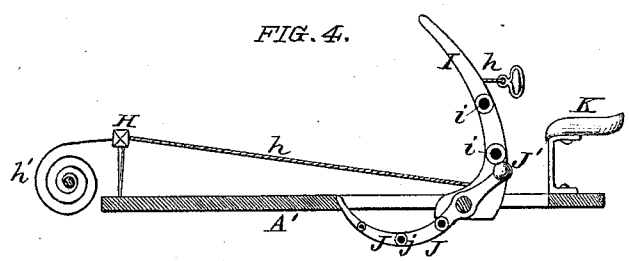

Figure 1 is a top view, showing the bunching and binding attachment applied to a reaper or harvester with spring-platform. Fig. 2 is a similar view, showing it applied to a "self-raker" harvester or reaper. Fig. 3 is a detail perspective view of the bunching and binding apparatus. Fig. 4 is a transverse section of a modification of the bunching and binding apparatus.

The main platform A of the machine, in its preferred form, has a rear part, A', elevated over the level of the part marked A. B B are the guard-fingers; C, the cutter-bar. D is the divider, and E the reel. F is a pivoted spring-platform, somewhat similar in construction to those in use upon dropper-harvesters. The platform is preferably formed of slats, as shown. G is a revolving rake, by which the cut grain is swept from the spring-platform F onto the raised part A' of the main platform, and into the course of an oscillatable rake, H, operated by a pull-cord, h, and a spring, h', by which the grain is drawn into the bunching apparatus for the action of the compression-arms. The bunching apparatus consists, in addition to rake H, of a fixed arm and an oscillating arm. The fixed or standing arm is composed of two parallel curved upwardly-extending bars, I, united by cross-pins that form the arbors of anti-friction rollers *i*. The friction-rollers may be dispensed with. J is an oscillating arm, which, like the fixed arm, is composed of two parallel curved bars united together by cross-pins that form the arbors of the anti-friction rollers *j*. Said arm J is provided with a foot-treadle, J', by which it is operated.

In Fig. 1, the apparatus is shown with duplicate compression-arms and rakes, so that an operator sits at each side of the machine, binding alternate sheaves. The operators sit on seats K K'.

In Fig. 2, the bunching and binding attachment is shown applied to the platform of a self-raking reaper or harvester. In this construction the cut grain is carried around on the reaper-platform L, onto the platform A', in the way of the pivoted rake H. This rake is operated in one way by a cord, *h*, extending within reach of the operator, and in the other direction by a spring, *h'*. In this form of attachment a single bunching mechanism is preferred.

M is a deflecting-board, to deflect the cut grain into the bunching mechanism. N is a deflector to prevent the grain from rubbing against the operator in the seat K.

In use, the grain, as it is cut by the cutter-bar, falls upon the spring-platform F, from which it is swept back by rake G onto the raised portion A' of the main platform, and lies between the rake H and the compression-arm I, so that the operator is enabled, by means of the rake H and operating-cord *h*, to draw the grain over the oscillating arm J, and so that when the operator raises said arm, by depressing the treadle J' with his foot, the grain will be compressed between said oscillating arm and the fixed arm I, and can be thus held until tied. The band used in tying is placed on the anti-friction rollers *i j* previous to the grain being drawn back by the rake G.

In the modification shown in Fig. 4, a sliding rake, H, is used instead of the pivoted rake shown in Figs. 1, 2, and 3, and is similarly operated in one direction by the cord *h*, and in the other direction by a spiral spring, *h'*, to which it is attached, and which also acts as a guide for the rake. Where two rakes, H, are used, one of them is supported on a curved arm, H', extending beneath the spring-platform, as shown.

I claim as my invention—

1. The combination of fixed arm I, oscillating arm J, and rake H, substantially as set forth.

2. The combination of fixed arm I, oscillating arm J, rake H, and operating-cord $h$ and spring $h'$, substantially as set forth.

JABEZ J. PIGGOTT.

Witnesses:
SAML. KNIGHT,
CHARLES PICKLES.